(12) United States Patent
Liardet et al.

(10) Patent No.: US 8,781,124 B2
(45) Date of Patent: Jul. 15, 2014

(54) PROTECTION OF A CIPHERING KEY AGAINST UNIDIRECTIONAL ATTACKS

(75) Inventors: Pierre-Yvan Liardet, Peynier (FR); Fabrice Marinet, Chateauneuf le Rouge (FR); Jérôme Tournemille, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 1 day.

(21) Appl. No.: 12/917,779

(22) Filed: Nov. 2, 2010

(65) Prior Publication Data

US 2011/0170691 A1 Jul. 14, 2011

(30) Foreign Application Priority Data

Nov. 4, 2009 (FR) ...................................... 09 57783

(51) Int. Cl.
*G06F 21/00* (2013.01)
*G06F 21/60* (2013.01)

(52) U.S. Cl.
USPC ........................................................ 380/259

(58) Field of Classification Search
USPC ........................................................ 380/259
See application file for complete search history.

(56) References Cited

U.S. PATENT DOCUMENTS

| | | | |
|---|---|---|---|
| 6,931,133 B2 * | 8/2005 | Andrews et al. | 380/286 |
| 2004/0096059 A1 | 5/2004 | Sco | |
| 2004/0186979 A1 | 9/2004 | Janke et al. | |
| 2007/0177720 A1 * | 8/2007 | Bevan et al. | 380/28 |
| 2007/0189536 A1 | 8/2007 | Gammel et al. | |
| 2008/0152144 A1 * | 6/2008 | Douguet et al. | 380/277 |
| 2009/0285398 A1 | 11/2009 | Liardet et al. | |

OTHER PUBLICATIONS

Concurrent Execution. In Microsoft Computer Dictionary. Microsoft Press 2002.*
French Search Report dated Sep. 2, 2010 from corresponding French Application No. 09/57783.
French Search Report dated Sep. 8, 2010 from corresponding French Application No. 09/57782.
Laurie Genelle et al., Securing AES Implementation against Fault Attacks, Fault Diagnosis and Tolerance in Cryptography (FDIC), 2009 Workshop on IEEE, Piscataway, NJ, Sep. 6, 2009, pp. 51-62, XP031627633.

* cited by examiner

*Primary Examiner* — William Powers
(74) *Attorney, Agent, or Firm* — Wolf, Greenfield & Sacks, P.C.

(57) ABSTRACT

A method for protecting a key implemented, by an electronic circuit, in a symmetrical algorithm for ciphering or deciphering a message, including the steps of: selecting in non-deterministic fashion a pair of different masks from a set of at least four different masks, the masks having the property of representing different bit combinations, at least by pairs of bits; executing the algorithm twice by applying, to the key or to the message, one of the masks of the selected pair at each execution; checking the consistency between the two executions.

26 Claims, 7 Drawing Sheets

PROTECTION OF A CIPHERING KEY AGAINST UNIDIRECTIONAL ATTACKS

CROSS REFERENCE TO RELATED APPLICATIONS

This application claims the priority benefit of French patent application Ser. No. 09/57783, filed on Nov. 4, 2009, entitled "Protection of a Ciphering Key Against Unidirectional Attacks," which is hereby incorporated by reference to the maximum extent allowable by law.

BACKGROUND OF THE INVENTION

1. Field of the Invention

The present invention generally relates to electronic circuits and, more specifically, to data processing units implementing ciphering or deciphering algorithms. The present invention more specifically relates to mechanisms for protecting one or several keys manipulated by such algorithms. In particular, the present invention applies to the detection of a unidirectional perturbation of bits of such a key.

2. Discussion of the Related Art

When a processing unit (typically, a cryptoprocessor) is used to implement a ciphering algorithm, it is desired to verify that the manipulated key is not modified (incidentally or deliberately), either during its transfer to the cryptoprocessor from an external circuit, or once in it while it is contained in a specific register of this cryptoprocessor. Attacks aiming at perturbing the state of the bit of a register of the cryptoprocessor generally are attacks using a laser pointed on bits of the register containing the key to perturb their value.

To counter a modification during the transfer, a solution is to reload the key in the cryptoprocessor as often as possible, generally on each new ciphering, or periodically. However, the key register of the cryptoprocessor remains sensitive to laser attacks.

To check the integrity of the key once it is in the cryptoprocessor, the simplest would be to read this key to control it outside of the cryptoprocessor. However, to protect the key against possible hacking attempts, the temporary storage element (register) which contains the key is generally only accessible in read mode from outside of the cryptoprocessor. The integrity check then amounts to checking the consistency of results obtained by two separate calculations using the key contained in the cryptoprocessor. These two calculations are either two cipherings of a same message with the key, or a ciphering followed by a deciphering.

However, the results of an integrity check mechanism may provide information to the attacker as to the value of the bits of the key. For example, if one of the bits of the key is modified in the key register and the old and new values of this bit are the same, the checking mechanism is incapable of noticing it, be the checking direct (by rereading) or indirect (by two separate calculations). This makes the key vulnerable to an attack or a perturbation known as a unidirectional perturbation, in which a bit of the key is forced to a single one of the possible values. For example, the attacked bit is forced to 0 whatever its initial state (1 or 0). The forcing of a bit to a single one of the two states may enable an attacker to determine the value of this bit according to whether his attack is or not detected (if it is not detected, then the actual bit of the key has the forced value—if it is detected, the actual bit of the key has the other state). By the repeating of this attack on each bit of the key, the value of said key can be obtained.

Further, a unidirectional attack may be simultaneously performed on several bits of a register, for example, by using several laser beams directed towards several cells of the register. The attacks targets registers used in the calculations. The countermeasures are thus relative to the used registers which, according to the algorithm, can only contain a portion of the message and/or of the key.

SUMMARY OF THE INVENTION

It would be desirable to have a mechanism of protection of the value of a key manipulated by a ciphering circuit, which overcomes all or part of the disadvantages of usual integrity check mechanisms.

It would also be desirable to detect a simultaneous unidirectional perturbation of several bits of a key, without for all this making the key vulnerable.

To achieve all or part of these and other objects, at least one embodiment of the present invention provides a method for protecting a key implemented, by an electronic circuit, in a symmetrical algorithm for ciphering or deciphering a message, comprising the steps of:

selecting in non-deterministic fashion a pair of different masks from a set of at least four different masks, the masks having the property of representing different bit combinations, at least by pairs of bits;

executing the algorithm twice by applying, to the key or to the message, one of the masks of the selected pair at each execution;

checking the consistency between the two executions.

According to an embodiment of the present invention, the masks are selected in non-deterministic fashion, by pairs of masks from a set of at least two different pairs of masks, the masks having the property that an XOR-type combination of the masks of a same pair provides a result where all bits are in a same state.

According to an embodiment of the present invention, the selection of the mask of the pair assigned to each execution is random.

According to an embodiment of the present invention, the algorithm is executed by successive iterations of identical operations, among which at least one non-linear function.

According to an embodiment of the present invention, each mask is applied to the message, sub-keys assigned to each iteration being generated by using the concerned mask, to unmask the message before application of the non-linear function.

According to an embodiment of the present invention, the algorithm used is the DES algorithm or one of its variations.

According to an embodiment of the present invention, the two executions are performed sequentially.

According to an embodiment of the present invention, the two executions are performed in parallel.

According to an embodiment of the present invention, the two executions are cipherings, the result of one of the executions being combined with the mask assigned to the other execution before the checking step.

According to an embodiment of the present invention, the two executions are a ciphering and a deciphering.

The present invention also provides an electronic circuit capable of implementing the above method.

The present invention also provides a system comprising an electronic ciphering or deciphering circuit and an electronic circuit for processing ciphered data or deciphered data, capable of implementing this method.

The foregoing objects, features, and advantages of the present invention will be discussed in detail in the following

DETAILED DESCRIPTION

The same elements have been designated with the same reference numerals in the different drawings. For clarity, only those steps and elements which are useful to the understanding of the present invention have been shown and will be described. In particular, what exploitation is made of the data to be ciphered or of the ciphered data has not been detailed, the present invention being compatible with any exploitation. Further, the elements of the cryptographic processing unit or of the other circuits have not been detailed, the present invention being here again compatible with usual structures. Reference will be made hereafter to term "ciphering" to designate, unless otherwise mentioned, a ciphering and/or a deciphering, which are similar mechanisms (application of an algorithm to data and one or several keys).

Figure 1:
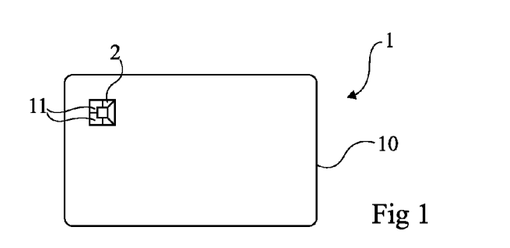
FIG. 1 is a simplified view of a chip card of the type to which the present invention applies as an example.

FIG. 1 is a simplified representation of a chip card 1 of the type to which the embodiments which will be described apply as an example. Such a card 1 is formed of a support 10, for example, made of plastic matter, which supports or comprises one or several integrated circuits 2. Circuit(s) 2 are capable of communicating with the outside of the card (for example, with a read or read-write terminal) by means of contacts 11 or by contactless transceiver elements (not shown) such as an electromagnetic transponder. Circuit(s) 2 comprise at least one ciphering unit (generally called a cryptoprocessor) capable of executing ciphering and/or deciphering calculations based on one or several keys loaded in the processing unit.

The use of ciphering algorithms has many applications in electronics, be it for chip card systems, toll television systems, ciphered communication systems, etc. In all cases, there is an algorithmic processing unit capable of implementing ciphering and/or deciphering mechanisms.

Figure 2:
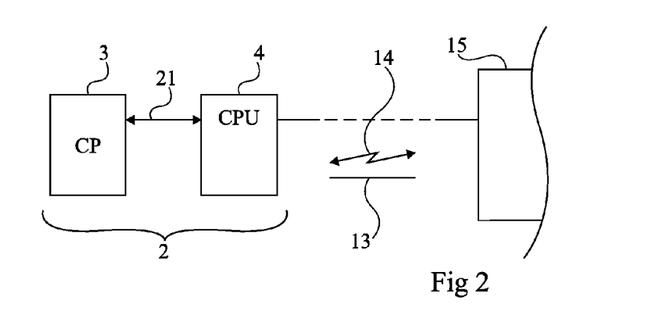
FIG. 2 is a block diagram of a system using a cryptoprocessor type ciphering/deciphering unit.

FIG. 2 is a block diagram of a system using a cryptoprocessor 3 (CP). This cryptoprocessor is an integrated circuit considered as tamper-proof, which implements one or several ciphering or deciphering algorithms applied to data that it receives from the outside, by using one or several keys that it contains or that it receives from the outside. Cryptoprocessor 3 is, for example, capable of communicating with a processing unit 4 (for example, a central processing unit CPU) of a circuit 2 integrating both elements 3 and 4 (and generally other circuits, not shown, such as volatile or non volatile memories, an input-output interface, etc.). Circuit 2 is capable of communicating over a wire link 13 or over a wireless link 14 with a separate device 15, for example, a circuit for exploiting the ciphered or deciphered data.

Figure 3:
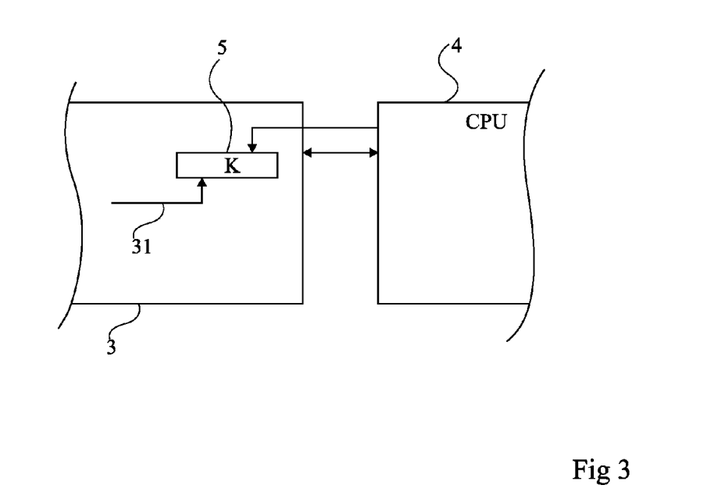
FIG. 3 is a partial block diagram of a circuit integrating a ciphering/deciphering unit and a central processing unit.

FIG. 3 is a detail of the diagram of FIG. 2 showing, in circuit 3, an internal temporary storage element 5 (typically a register) for storing the ciphering key. Of course, unit 3 generally comprises several registers for temporarily storing the ciphered data, the data to be ciphered and other variables, as well as other elements enabling it to execute the ciphering algorithm (wired logic, memories, software instruction processing unit, etc.). Register 5 will here be designated as a key register. Unit 3 may contain several key registers. The content of register 5 is read by cryptoprocessor 3 (connection 31) each time it needs the key for a ciphering or deciphering operation.

Figure 4A:
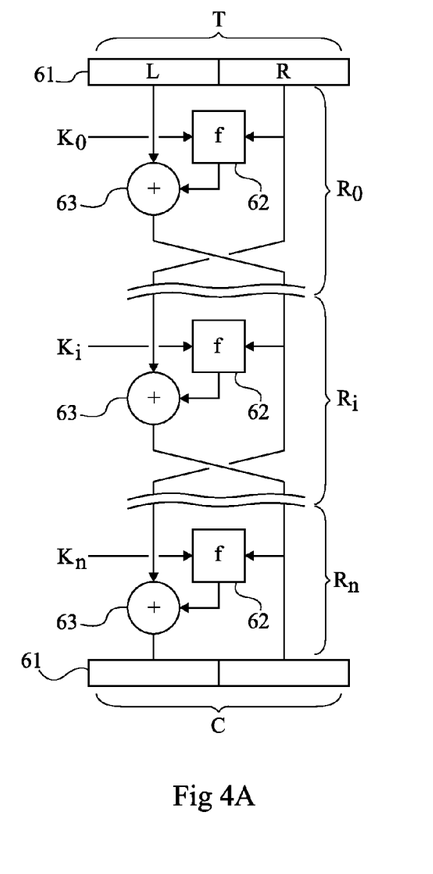
FIGS. 4A and 4B are block diagrams illustrating an example of ciphering and deciphering algorithm to which an integrity check is to be applied.
Figure 4B:
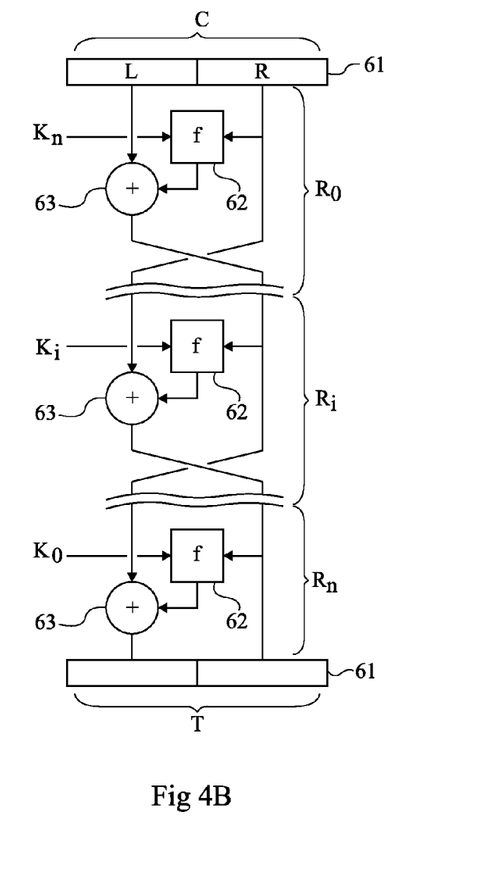

FIGS. 4A and 4B respectively illustrate, in the form of blocks, the architecture of ciphering and deciphering algorithms of the type to which the protection applies as an example.

The concerned algorithms are so-called Feistel algorithms. Such algorithms perform a symmetrical ciphering, by blocks, and are characterized by similar or even identical ciphering and deciphering operations, only requiring an inversion of the order in which the keys (or sub-keys) extracted from the key contained in the key register are used. Most often, Feistel networks or diagrams combine several iterations or rounds of identical operations comprising a diffusion function (for example, a bit permutation), a non-linear function (for example, of substitution type) generating a confounding effect, and a linear mixture using a bit-to-bit combination (bit-to-bit XOR).

An example of a Feistel algorithm that may be used is the DES algorithm (Data Encryption Standard) and its different variations.

The ciphering operation (FIG. 4A) comprises submitting a message to be ciphered T (plain text) to successive operations. Message T is separated in two portions of identical sizes (arbitrarily designated as right-hand portion R and left-hand portion L). This message is contained in a register 61 of circuit 3 (or in two registers respectively assigned to the right-hand and left-hand portions). The algorithm is performed in n+1 rounds $R_i$ (with i ranging between 0 and n>1). At each round, right-hand portion R of register 61 is submitted (block 62) to a non-linear function f with a sub-key $K_i$ (with i ranging from 0 to n). This sub-key is obtained from a general ciphering key (typically, key K contained in register 5—FIG. 3). The result of the ciphering function is mixed (block 63, bit-to-bit addition modulo 2 or bit-to-bit XOR combination) with left-hand portion L of the register which corresponds to the result of the previous round (message T for first round $R_0$). Finally, right-hand and left-hand portions R and L are permuted for the next round. At the end of the n-th round, ciphered message C is obtained. Last round $R_n$ generally comprises no permutation of the right-hand and left-hand portions. Message C is generally contained in register 61, which has been used during the entire calculation. The same calculation cell (function 62 and combiner 63) may be used for each round.

The deciphering operation (FIG. 4B) comprises submitting a ciphered message C (ciphered text) to the n rounds $R_i$, but using the sub-keys in a reverse order (starting with key $K_n$ to end with key $K_0$), to obtain plain text T.

In the case of the DES algorithm, the first round is preceded by a bit mixing operation (permutation) and the last round is followed by the reverse operation.

When an integrity check mechanism is applied where two successive or parallel cipherings are compared or a ciphering followed by a deciphering is performed, the result of this check is a weak point for unidirectional attacks, in particular when such attacks are over several bits. A unidirectional attack over two bits comprises performing two successive attacks by simultaneously forcing two bits of the key register to a same state, then a bit to one state and the other to the opposite state. This thus amounts to dividing the attack into two partitions. If the two bits of the key are identical and the perturbation is not detected, this means that the state of these two bits is that (for example, 11) to which they have been forced. If the perturbation is detected, this means either that the two bits are in the other state (00), or that they are in different states (01 or 10). The second partition comprises forcing one of the bits to a state (for example, to 0) and the other one to the opposite state (for example, 1). If the perturbation is not detected, the states are determined (01). If the perturbation is detected, this means either that the two bits are in a same state (00), or that the states are different, but inverted (10) with respect to those to which they have been forced. There only remains one case of uncertainty: that where the two partitions have led to an integrity violation detection by the circuit.

By repeating the attack by bit pairs for all the key bits, all the pairs having a same common bit (for example, the first or the last one), this uncertainty can be raised. For example, by directing the perturbation on the first bit of the previous attack and on a third bit, it can become possible not only to determine the state of this third bit, but also to raise the possible uncertainty on the former ones. In the above examples of states for the first attack, if the first partition of the second attack is not detected, this means that the first and third bits are at state 1. If the two partitions of the first attack had been detected, then the second bit would be at state 0. The second partition of the second attack can thus be omitted. If the first partition (of the second attack) is detected and the two partitions of the first attack have been detected, the second partition must be exploited.

If the second partition of the second attack is not detected, this means that the first bit is at state 0 and the third bit is at state 1. If the two partitions of the first attack have been detected, then the second bit is at state 0. If the second partition of the second attack is detected, this means that the first and third bits are either 00 or 10. The third bit is thus 0. If there was an uncertainty after the first attack, it cannot be raised yet. However, if the attacks are continued by always reusing the first bit in the pairs, the uncertainty will be raised as soon as the other bit of the pair will be 1.

Thus, at the end of the attack on all the paired bits, the attacker knows the key.

Another possibility to carry out a unidirectional attack over two bits is to process the bits in successive pairs with no common bit. In this case, possible uncertainties are raised by changing the states of the attack applied to the bit pairs.

This type of attack can be envisaged over more than two bits by increasing the number of partitions of the attacks.

Figure 5:
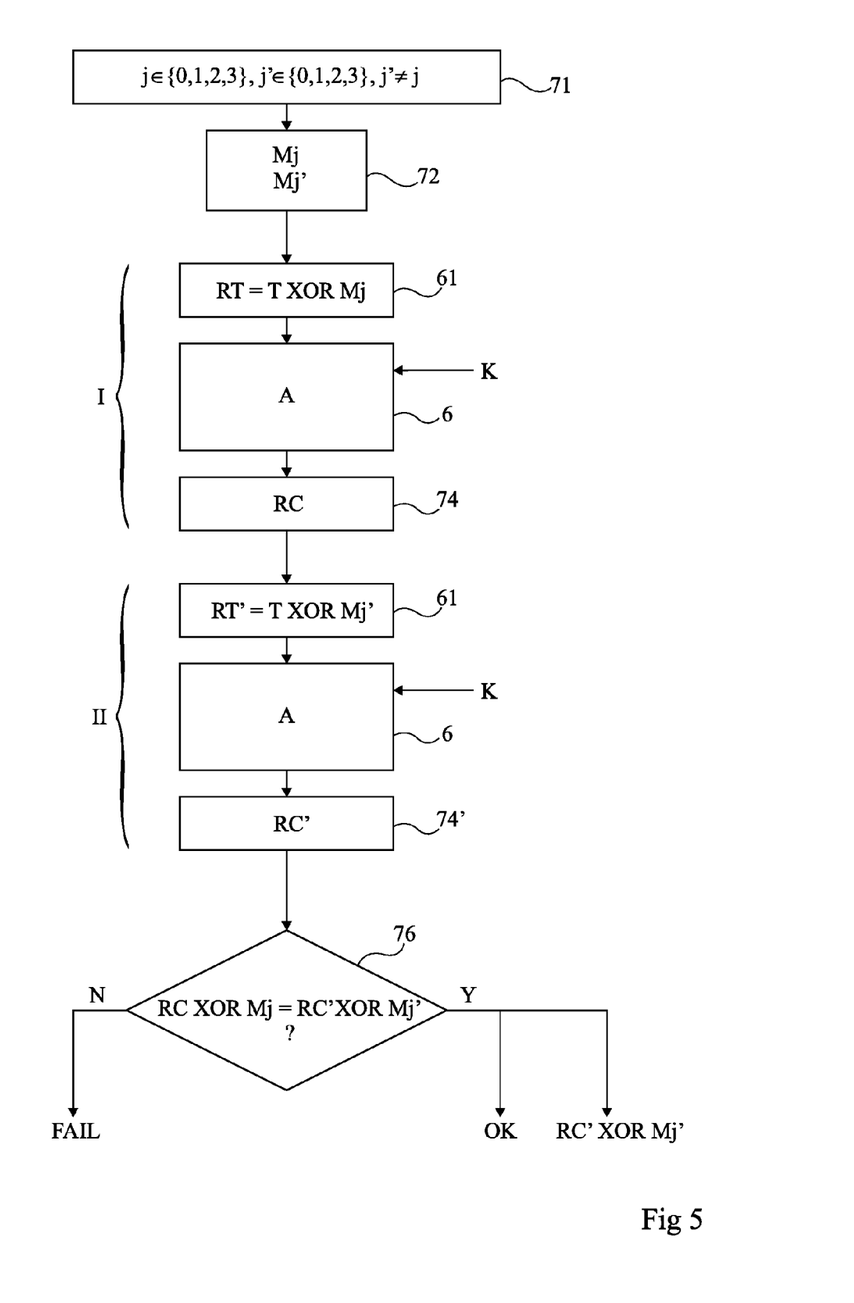
FIG. 5 very schematically illustrates in the form of blocks an embodiment of the protection mechanism.

FIG. 5 is a block diagram of an embodiment of a mechanism for checking the integrity of a key K, protected against a unidirectional perturbation, by pairs of bits of the key.

Two applications of the algorithm are performed successively or in parallel by applying, to the key or to the message, two masks randomly selected from a set of at least four masks.

"Mask" is used to designate a word comprising a same number of bits as the element to be masked (for example, 64 bits for the DES key). The masking operation comprises combining by bit-to-bit XOR the word to be masked and the mask. For simplification, the masks will be expressed hereafter in hexadecimal notation and over two characters only if the characters of the mask are identical, or over the characters to be respected over the entire length of the mask (for example, FF for FF . . . FF, 05FA for 05FA . . . 05FA).

The masks are selected so that each mask represents, for each group of bits corresponding to the selected masking granularity, one of the possible values of the bit combination. For example, for a two-bit granularity, at least four masks are used which, by pairs of bits, each show one of the four possible combinations. For a granularity over three bits, at least eight masks will be used which, by triplets of bits, each represent one of the eight possible combinations. The granularity selected for the mask is a function of the number of unidirectional attack bits against which it is desired to be protected. An embodiment of the present invention will be described hereafter in relation with an example of four masks with a granularity of two bits to be protected against unidirectional attacks over two bits. For example, the masks may be 00, FF, 55, and AA. Masks 05FA, F5A0, 5A0F, and A0F5 may also be selected.

In the example of FIG. 5, the use of four masks is assumed. A non-deterministic selection (random or pseudo-random) is performed (block 71, j∈R{0, 1, 2, 3}, j'∈R{0, 1, 2, 3}, j'≠j) between four values (for example, 0, 1, 2, 3) to select pair Mj and Mj' of masks with which the checking steps will be performed. This selection is such that indexes j and j' are different from each other.

Two applications I and II of algorithm A (block 6) are successively performed by using first mask Mj, followed by second mask Mj'.

Message T is assumed to be present in a register 61. The content of this register is modified to obtain a mask text RT corresponding to the XOR combination of message T with mask Mj (RT=T XOR Mj). In the DES algorithm, the same mask must be applied on the right-hand portion and on the left-hand portion of the message. In the example of FIG. 5, application I by cryptoprocessor 3 of the algorithm A to message T is assumed to be performed in a register 61 and its application II to message T masked by second mask Mj' (RT'=T XOR Mj') is assumed to be performed in the same register. In this case, the first obtained result RC is transferred into a register 74 before the second application of the algorithm having a result RC' that may be transferred into a register 74'. As a variation, two different registers are used for both calculations I and II, which avoids to transfer the results.

The masking of the message leads to intervening on (masking) the generation of the sub-keys (or round keys) from key K, which will be discussed hereafter in relation with FIGS. 7, 8, and 8A.

To be able to check the consistency between results RC and RC', their unmasked values RC XOR Mj and RC' XOR Mj' are compared with each other (block 76, RC XOR Mj=RC' XOR Mj'?). The unmasking may occur at the comparison or, upstream, at the end of the application of the algorithm.

If comparison 76 validates the checking (OK, output Y of block 76), the result (RC' XOR Mj') which may be output from the cryptoprocessor (placed in an internal storage element, accessible in read mode by central processing unit 2 or another circuit using processor 3) is in any of registers 74 and 74' and has been checked.

In the opposite case (FAIL, output N of block 76), an integrity failure of the key, that is, a modification of at least one bit thereof between the two executions of the algorithm, is detected. The comparison is preferably performed by the cryptoprocessor. An integrity failure is used to prevent the ciphered result from exiting the cryptoprocessor, or to undertake any other appropriate action in case an incidental or malicious (attack) modification of the key is suspected.

As a variation, if the two executions I and II are performed in parallel (and thus at the same time), four registers should be used for variables RT, RT' and for the keys.

When an attacker targets an attack by unidirectional perturbation over two bits of the key register, the fault detection capable of providing him with information will indicate a fault which depends on the used pair of masks. The analysis of the partitions of the detection provides him with a result, but due to the random selection of the masks, this result is erroneous.

Figure 6:
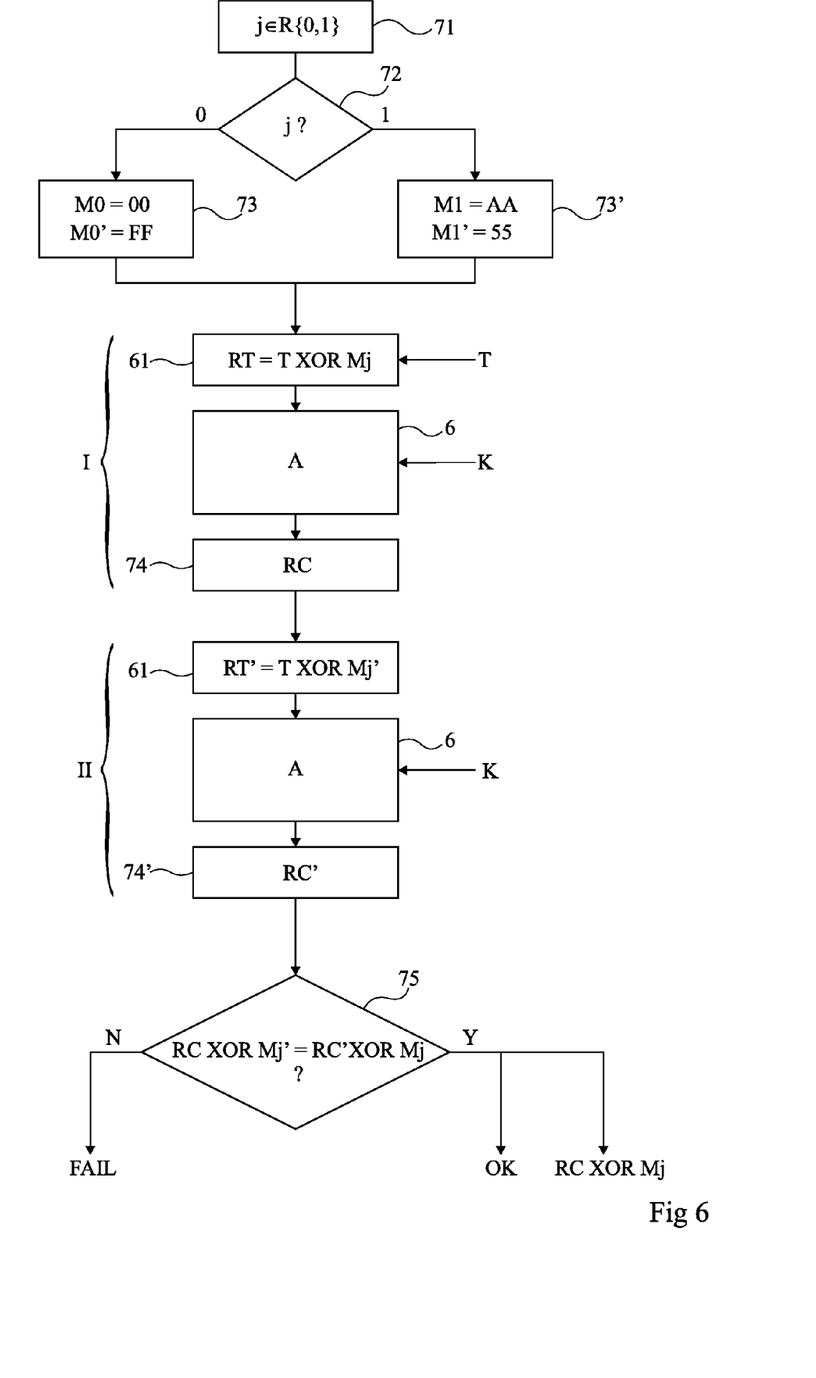
FIG. 6 very schematically illustrates in the form of blocks another embodiment of the protection mechanism.

FIG. 6 illustrates another embodiment of the protection mechanism in which, as compared with the embodiment of FIG. 5, the masks are applied by predefined pairs, randomly selected from a set of at least four masks. In other words, a set of at least two pairs of masks is formed and, for each execution of the check mechanism, one of the two pairs is randomly selected to apply each of the masks to one of the two executions.

In this example, the pairs of masks are selected so that the XOR combination of the two masks of a same pair only provides bits at state 0 or bits at state 1.

In the example of FIG. 6, the use of four masks is assumed. A non-deterministic selection (random or pseudo-random) is performed (block 71, j∈R{0, 1}) between two values (for example, 0, 1) to select the pair of masks with which the checking steps will be carried out.

According to state 0 or 1 of selection bit j (block 72, j?), a first pair (block 73, M0, M0'), or a second pair (block 73', M1, M1') of masks is selected. In the example of FIG. 5, masks M0 and M0' are respectively assumed to be 00 and FF and masks M1 and M1' are respectively assumed to be 55 and AA.

As in the embodiment of FIG. 5, two applications I and II of algorithm A (block 6) are successively performed by using first mask Mj (masked text RT corresponding to the XOR combination of message T with mask Mj—block 61, RT=T XOR Mj), then the second mask Mj' (masked text RT' corresponding to the XOR combination of message T with mask Mj'—block 61, RT'=T XOR Mj').

The consistency between results RC and RC' of applications I and II is checked by applying mask Mj to result RC' and mask Mj' to result RC (block 75, RC XOR Mj'=RC' XOR Mj?). Result RC XOR Mj is delivered if test 75 confirms the consistency of the two calculations.

Preferably, in the embodiment of FIG. 6, the order of executions I and II (in a sequential execution) or of the registers containing variables RT and RT' (in a parallel execution by two calculation cells) is randomly selected. This improves the efficiency of the protection mechanism.

Figure 7:
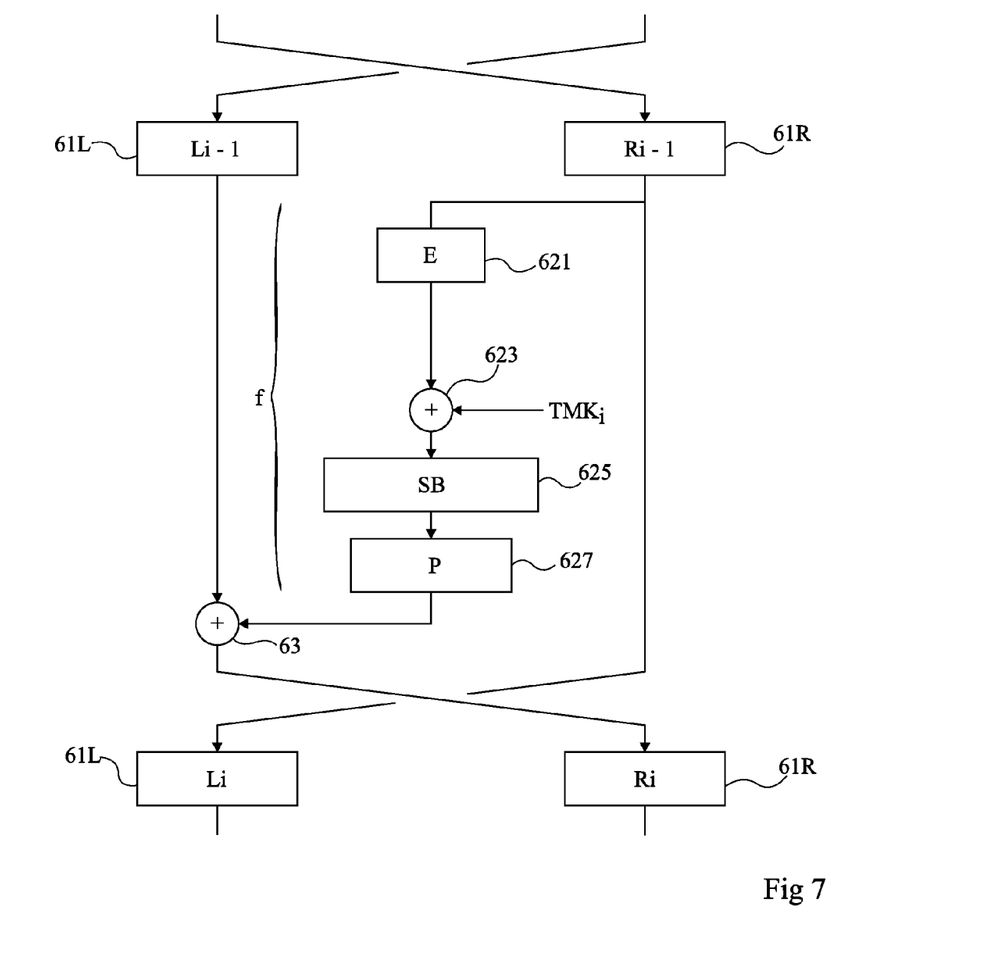
FIG. 7 illustrates an embodiment of an iteration of the ciphering algorithm of the mechanism of FIG. 5 or 6.

FIG. 7 shows the detail of function f (block 62) of a round of the DES algorithm. As indicated previously, register 61 containing the message which is being ciphered is divided into a right-hand portion 61R and a left-hand portion 61L. FIG. 7 illustrates the case of a round of rank i. Before this round, the right-hand and left-hand portions respectively contain results $R_{i-1}$ and $L_{i-1}$ of the previous round (after crossing). Right-hand portion $R_{i-1}$ is submitted to function f of the algorithm. A first transformation comprises an expansion 621 (E) of the size of the word (for example, from 32 to 48 bits). Then, the result is mixed (XOR 623) with sub-key $K_i$. However, for the function of the DES algorithm to be respected, the sub-key unmasks the result of the combination so that the next non-linear operation is performed on unmasked data. This is symbolized by the application of a sub-key $TMK_i$, which will be obtained as described in relation with FIGS. 8 and 8A. Once combination 623 is performed, the result ($E(R_{i-1})$ XOR $TMK_i$) is submitted to a substitution box 625 or Sbox (SB), followed by a permutation 627 (P). The result of the permutation is combined 63 with the left-hand portion ($L_{i-1}$) of the register. Combination 63 reintroduces the masking. Then, the result of the combination is loaded into the right-hand portion of the register while the right-hand portion resulting from the previous round is loaded into left-hand portion 61R. These right-hand ($L_i$) and left-hand ($R_i$) portions are then submitted to the next round.

Apart from the fact that the data (message and key) take into account the mask corresponding to the execution, the steps described in relation with FIG. 7 are the usual steps of the DES algorithm. Reference can for example be made to document "Federal Information Processing Standards Publication 46-3", Oct. 25, 1999, describing the DES.

Figure 8:
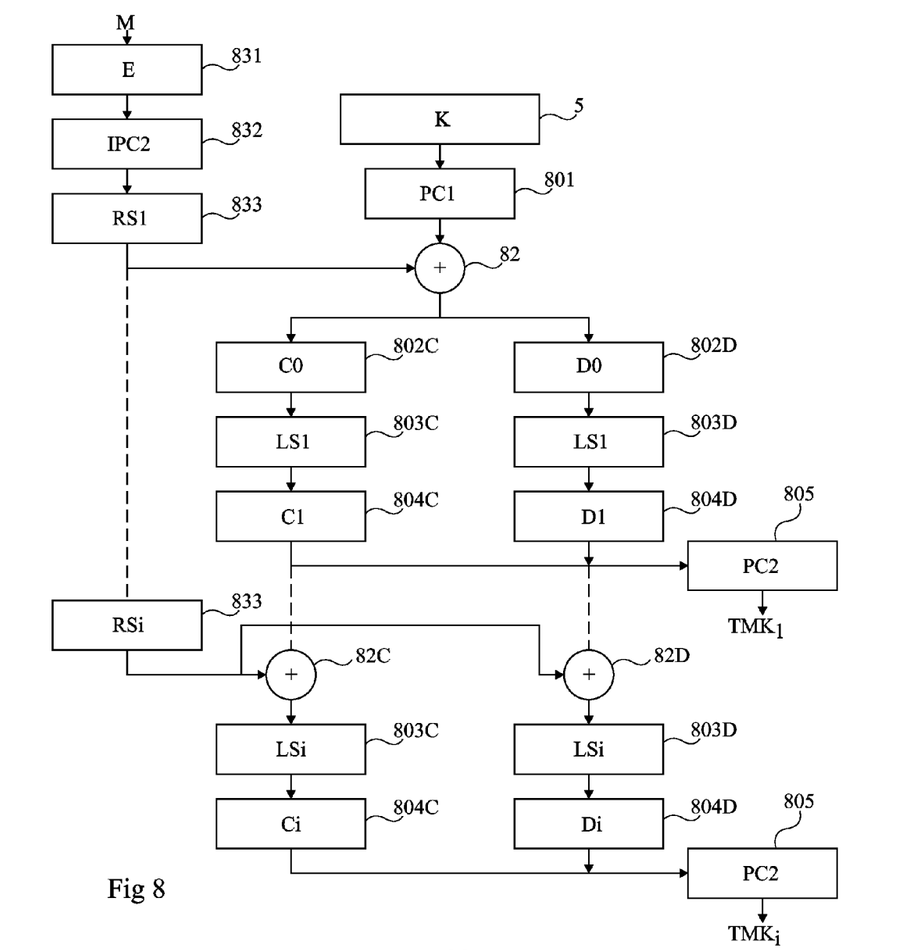
FIG. 8 shows an example of generation of sub-keys for the algorithm of FIG. 7.
Figure 8A:
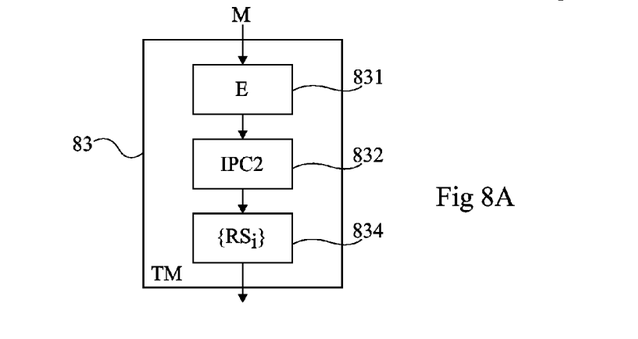
FIG. 8A is a detail of FIG. 8.

FIGS. 8 and 8A illustrate an example of generation of sub-keys $TMK_i$ exploited by the iterations described in FIG. 7.

Key K contained in register 5 is first submitted to a first bit permutation PC1 (block 801).

In a usual process, the key is separated in two left-hand and right-hand portions C0 and D0 (blocks 802C and 802D), after which each portion is submitted to a leftward circular shift (blocks 803C and 803D). The number of circular shift bits (0, 1, or 2 for the DES) depends on rank i of the concerned round. Results C1 and D1 (blocks 804C and 804D) are concatenated, then submitted to a second bit permutation PC2 (block 805) to provide the first sub-key.

To provide the next sub-keys, left-hand and right-hand portions $C_{i-1}$ and $D_{i-1}$ are submitted to circular shifts 803C and 803D and results $C_i$ and $D_i$ are submitted to permutation PC2 to provide the sub-key of rank i.

In the embodiment of FIGS. 5 and 6, the sub-key needs to take part in the unmasking of the message before application of substitution boxes 625. For simplification, reference will be made to a mask M. The provided sub-key $TMK_1$ should thus have value $K_1$ XOR E(M). In the example of FIG. 8, the result of first permutation 801 is combined by XOR 82 with a function TM applied to mask M. Function TM successively comprises an expansion E (block 831) of mask M, a reverse cyclic permutation 832 (IPC2) implementing the inverse of second permutation PC2 and a rightward shift (block 833, RS1) by a number of bits identical to the number of bits provided for leftward shift 803C and 803D. Result RS(IPC2 (E(M))) is combined with value PC1(K) provided by block 801.

For the next round of rank i, function TM 83 (FIG. 8A) is similar but comprises a number of circular rightward shifts which is a function of the rank of the round. In fact, the number of shifts corresponds to the sum of the shifts performed until and including the concerned round (block 834, {RSi}). The result of function 83 is combined in left-hand and right-hand portions by XOR 82C, 82D with contents $C_{i-1}$ and $D_{i-1}$ of the previous key round, before being submitted to leftward circular shift 803C and 803D (LSi).

It can be seen that key $TMK_i$, modified by function TM, is $K_i$ XOR E(M). By combining it (block 623, FIG. 7) with value $E(R_{i-1}$ XOR M) provided by block 621, the right-hand portion, unmasked and combined with key $K_i$ XOR $E(R_{i-1})$ is effectively obtained.

Figure 9:
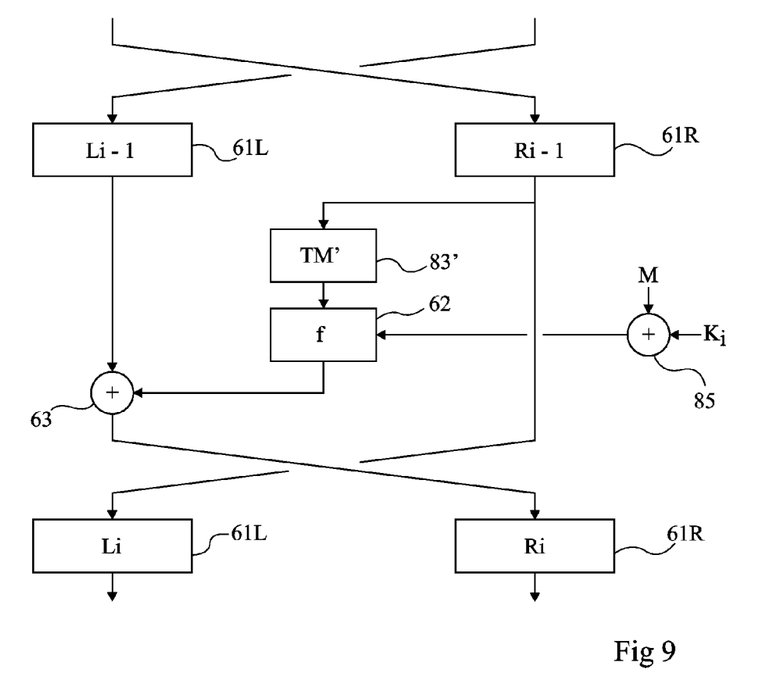
FIG. 9 illustrates another implementation mode of an iteration of the ciphering algorithm according to another embodiment of the protection mechanism.
Figure 9A:
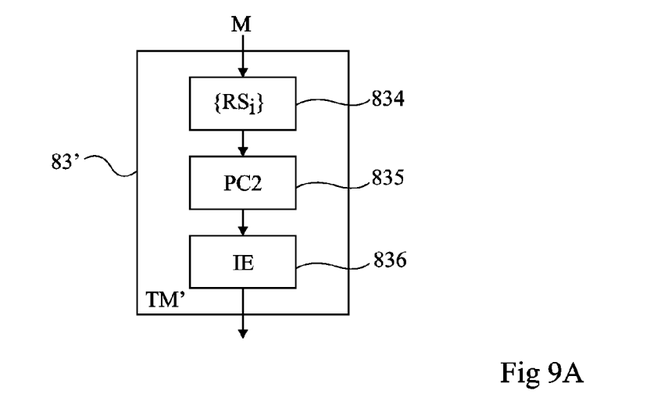
FIG. 9A is a detail of FIG. 9.

FIGS. 9 and 9A show another embodiment according to which the masking with mask M or M' is applied to key K and not to message T. FIG. 9 should be compared with FIG. 8 and FIG. 9A should be compared with FIG. 8A.

The right-hand portion $R_{i-1}$ of each round is submitted to a function TM' (block 83') before application of function f so that the masking of round key $K_i$ with mask M (XOR combination 85) is removed before the substitution box of function f is applied (block 62). As illustrated in FIG. 9A, function TM comprises applying a number of rightward circular shifts RSi (block 834) which is a function of the rank of the round, followed by a permutation PC2 (block 835) equivalent to second permutation PC2 of the sub-key generation mechanism, and finally the inverse expansion of E, noted IE (block 836). At the input of function f of rank i, the right-hand portion is thus represented by $IE(PC2(\{RSi(R_{i-1})\}))$.

The subsequent operation can be induced from that discussed in relation with the previous embodiment.

According to an alternative embodiment, rather than checking the identity of results RC and RC" of two successive applications I and II of the algorithm, a ciphering followed by a deciphering is performed by application of one of the masks of the pair to the ciphering and of the other one to the deciphering. Two alternatives corresponding to executions I and II are then possible. The DES algorithm may be applied to message T masked with mask Mj while also masking key K with mask Mj, after which the inverse DES algorithm may be applied to the obtained result previously masked with Mj XOR Mj' and the key may be masked with mask Mj', or the DES algorithm may be applied to message T masked with mask Mj' while also masking key K with mask Mj', after which the inverse DES algorithm may be applied to the obtained result previously masked with Mj' XOR Mj and the key may be masked with mask Mj.

The provided protection mechanisms are compatible with usual cryptoprocessor structures and require no modification thereof. In particular, it is always possible to choose between a parallel or series checking and to share the calculation cell.

The efficiency of such a mechanism can be acknowledged by modifying, after the loading of the key into the cryptoprocessor or on each loading of this key, two bits of the key register or of the register containing the message. If this mechanism has been implemented, the application of the key obtained by the attack does not enable the ciphering. If it has not, the two-bit unidirectional attack provides the key.

An additional advantage of the performed checking is that it checks the very execution of the ciphering algorithm. Indeed, if an error occurs during the execution of the algorithm, the results will not match.

On the other hand, due to the random selection of the masks and, preferentially, to the order of the applications of the algorithm, the hacker cannot determine the original state of the key since the unidirectional perturbation will occur with an equal probability for each key bit.

Different embodiments have been described. Different alterations, modifications, and improvements are within the abilities of those skilled in the art. In particular, the selection between a parallel or series execution (successive executions) in practice depends on a compromise between the processing speed and the cryptoprocessor bulk. Further, the practical implementation is within the abilities of those skilled in the art based on the functional indications given hereabove, be it for a software or hardware implementation. Further, although the present invention has been described in relation with the DES algorithms, it more generally applies to symmetrical algorithms respecting the same properties. Finally, although the present invention has been described in relation with an example using four masks, the number of masks is not limited.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting a key implemented, by an electronic circuit, in a symmetrical algorithm for ciphering or deciphering a message, comprising the steps of:
   selecting at least four different masks so that each mask comprises bits representing, for a number of bits from bits of the key that are desired to be protected, a combination from all possible different combinations of the bits desired to be protected;
   selecting in non-deterministic fashion a pair of different masks from a set of the at least four different masks;
   executing the algorithm twice by applying, to the key or to the message, one of the masks of the pair selected at each execution; and
   checking the consistency between the two executions.

2. The method of claim 1, wherein the masks are selected in non-deterministic fashion, by pairs of masks from a set of at least two different pairs of masks, the masks having the property that an XOR-type combination of the masks of a same pair provides a result where all bits are in a same state.

3. The method of claim 2, wherein the selection of the mask of the pair assigned to each execution is random.

4. The method of claim 1, wherein the algorithm is executed by successive iterations of identical operations, among which at least one non-linear function.

5. The method of claim 4, wherein each mask is applied to the message, sub-keys assigned to each iteration being generated by using the concerned mask, to unmask the message before application of the non-linear function.

6. The method of claim 1, wherein the algorithm used is the DES algorithm or one of its variations.

7. The method of claim 1, wherein the two executions are performed sequentially.

8. The method of claim 1, wherein the two executions are performed in parallel.

9. The method of claim 1, wherein the two executions are cipherings, the result of one of the executions being combined with the mask assigned to the other execution before the checking step.

10. The method of claim 1, wherein the two executions are a ciphering and a deciphering.

11. An electronic circuit for protecting a key implemented, by an electronic circuit, in a symmetrical algorithm for ciphering or deciphering a message, configured to:
   select at least four different masks so that each mask comprises bits representing, for a number of bits from bits of the key that are desired to be protected, a combination from all possible different combinations of the bits desired to be protected;
   select in non-deterministic fashion a pair of different masks from a set of the at least four different masks;
   execute the algorithm twice by applying, to the key or to the message, one of the masks of the pair selected at each execution; and
   check the consistency between the two executions.

12. The electronic circuit of claim 11, wherein the masks are selected in a non-deterministic fashion, by pairs of masks from a set of at least two different pairs of masks, the masks having the property that an XOR-type combination of the masks of a same pair provides a result where all bits are in a same state.

13. The electronic circuit of claim 12, wherein the selection of the mask of the pair assigned to each execution is random.

14. The electronic circuit of claim 11, wherein the algorithm is executed by successive iterations of identical operations, the identical operations comprising at least one non-linear function.

15. The electronic circuit of claim 14, wherein each mask is applied to the message, sub-keys assigned to each iteration of the successive iterations of identical operations being generated by using the mask, to unmask the message before application of the at least one non-linear function.

16. The electronic circuit of claim 11, wherein the two executions are performed in parallel.

17. The electronic circuit of claim 11, wherein the two executions are cipherings, the result of one of the two executions being combined with the mask assigned to other execution of the two executions before checking the consistency between the two executions.

18. The electronic circuit of claim 11, wherein the two executions comprise a ciphering and a deciphering.

19. A system comprising an electronic circuit executing an algorithm for ciphering or deciphering and an electronic circuit for processing ciphered data or deciphered data, the system being configured to:
   select at least four different masks so that each mask comprises bits representing, for a number of bits from bits of the key that are desired to be protected, a combination from all possible different combinations of the bits desired to be protected;
   select in non-deterministic fashion a pair of different masks from a set of the at least four different masks;
   execute the algorithm twice by applying, to the key or to the data, one of the masks of the pair selected at each execution; and
   check the consistency between the two executions.

20. The system of claim 19, wherein the masks are selected in a non-deterministic fashion, by pairs of masks from a set of at least two different pairs of masks, the masks having the property that an XOR-type combination of the masks of a same pair provides a result where all bits are in a same state.

21. The system of claim 20, wherein the selection of the mask of the pair assigned to each execution is random.

22. The system of claim 19, wherein the algorithm is executed by successive iterations of identical operations, the identical operations comprising at least one non-linear function.

23. The system of claim 22, wherein each mask is applied to the data, sub-keys assigned to each iteration of the successive iterations of identical operations being generated by using the mask, to unmask the data before application of the at least one non-linear function.

24. The system of claim 19, wherein the two executions are performed in parallel.

25. The system of claim 19, wherein the two executions are cipherings, the result of one of the two executions being combined with the mask assigned to other execution of the two executions before checking the consistency between the two executions.

26. The system of claim 19, wherein the two executions comprise a ciphering and a deciphering.

\* \* \* \* \*